(12) United States Patent
Knutson et al.

(10) Patent No.: US 6,747,983 B1
(45) Date of Patent: Jun. 8, 2004

(54) TRANSPORT PACKET RATE CONVERSION

(75) Inventors: Paul Gothard Knutson, Indianapolis, IN (US); Kumar Ramaswamy, Indianapolis, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/396,229

(22) Filed: Sep. 15, 1999

Related U.S. Application Data

(60) Provisional application No. 60/102,873, filed on Oct. 2, 1998.

(51) Int. Cl.[7] .............................................. H04L 12/28
(52) U.S. Cl. ........................ 370/412; 370/429; 370/537
(58) Field of Search ................................ 370/428, 429, 370/412, 414, 468, 503, 569, 535, 537, 540, 543–544; 714/2, 48

(56) References Cited

U.S. PATENT DOCUMENTS

| | | | | |
|---|---|---|---|---|
| 5,323,426 A | * | 6/1994 | James et al. | 375/372 |
| 5,365,519 A | * | 11/1994 | Kozaki et al. | 370/378 |
| 5,566,174 A | * | 10/1996 | Sato et al. | 370/468 |
| 5,581,585 A | | 12/1996 | Takatori et al. | 375/376 |
| 5,671,253 A | | 9/1997 | Stewart | 375/316 |
| 5,825,778 A | | 10/1998 | Hauge | 370/473 |
| 5,936,968 A | * | 8/1999 | Lyons | 370/503 |
| 6,229,863 B1 | * | 5/2001 | Rude | 375/372 |
| 6,449,291 B1 | * | 9/2002 | Burns et al. | 370/516 |

FOREIGN PATENT DOCUMENTS

| WO | 98/13929 | 4/1998 | H03D/1/06 |
|---|---|---|---|

OTHER PUBLICATIONS

U.S. patent application Ser. No. 09/187,318, Knutson et al., filed Oct. 1998.

Moonky Lee et al., *Revised Record/Playback Interface Systems for GA–HDTV, HD–VCR and D3 VTR*, IEEE Transactions on Consumer Electronics, vol. 42, No. 1, Feb. 1996, pp. 128–131.

Shoji Kitaori et al., *Channel Coding Scheme for ¾ in HDTV Digital VCR*, Signal Processing: Image Communication 5 (1993), Elsevier Science Publishers B.V., SSDI 0923–5965 (93) E0031–X, pp. 425–430.

* cited by examiner

*Primary Examiner*—Frank Duong
*Assistant Examiner*—Melanie Jagannathan
(74) *Attorney, Agent, or Firm*—Joseph S. Tripoli; Joseph J. Laks; Ronald H. Kurdyla

(57) ABSTRACT

An output packet stream generator in a remodulator system includes a source of a stream of input transport packets and a source of additional packets. A multiplexer is coupled to the input transport packet stream source and the additional packet source and generates the output packet stream. A control signal has a variable characteristic having a first state when an input transport packet should be inserted into the output packet stream and a second state when additional packets should be inserted into the output packet stream. A multiplexer controller conditions the multiplexer to insert an input transport packet into the output packet stream when the control signal has the first state, and an additional packet into the output packet stream when the control signal has the second state.

20 Claims, 4 Drawing Sheets

TRANSPORT PACKET RATE CONVERSION

This is a non-provisional application of provisional application Serial No. 60/102,873 by Paul G. Knutson et al., filed Oct. 2, 1998.

The present invention relates to a system for converting a packet transport stream from one packet rate to another packet rate.

Information is increasingly being transmitted digitally, and digital information may be transmitted in the form of a stream of packets carrying the information. For example, current digital television signals are transmitted by packet stream. The packet streams are encoded and modulated onto carriers using differing modulation schemes. For example, packet streams carrying terrestrial digital television signals in the United States are modulated using 8 level vestigial sideband modulation using trellis encoding (8 VSB-t). Packet streams carrying digital cable television signals in the United States are modulated using 64 level or 256 level quadrature amplitude modulation (64 QAM or 256 QAM) or 16 level vestigial sideband modulation (16 VSB). Packet streams carrying satellite television signals are modulated using quadrature phase-shift-keyed modulation (QPSK). Each packet stream is specially encoded for the modulation it will receive, resulting in different packet rates, and bit rates for the respectively modulated packetized bit streams, ranging from around 19 megabits per second (Mbps) for 8 VSB-t to around 39 Mbps for 16 VSB and 256 QAM.

In some applications it is required that particular packets be processed at specific times or over specific time intervals. In particular in television signal transmission systems, it is required that e.g. image information in particular packets carrying video signal data be displayed at particular relative times. Otherwise, the image will appear too fast, too slow, or jerky due to jitter. To avoid this problem, time stamp information is generated at the transmitting location and inserted into the packet stream. These time stamps are used to ensure that images are displayed at correct times, minimizing the jitter problem described above.

It is sometimes desired to convert from one modulation format to another. For example, a digital television receiver may properly receive, decode and display only 16 VSB or 8 VSB-t modulated digital packet streams. But digital video cassette recorders (DVCR) and/or cable and satellite set top box receivers may properly receive and process only cable (64 QAM, 256 QAM, 16 VSB) or satellite (QPSK) modulated digital packet streams. In order for the DVCR and cable or satellite set top boxes to properly operate with such a digital television, they must remodulate the received signal in the modulation recognized by the television receiver (16 VSB or 8 VSB-t).

It is also sometimes desired that additional information be added to the data stream by the DVCR or set top box. For example, on-screen displays (OSDs) may be generated to inform the user of the status of the DVCR or set top box. Specifically, in a DVCR, an OSD with the word "PAUSE" or "REWIND" may be generated as appropriate; or a complete bit-mapped graphic may be displayed. This information may be easily added to a component video signal. However, in digital transmission systems, it is much preferred to add OSD information as additional packets carrying auxiliary data in television program packet streams. The receiver decodes the auxiliary data packets, generates an OSD representative signal locally, and combines that signal with the video signal. However, television packet data streams are generally produced at the maximum data rate, meaning that every available bit is used for the digital information representing the television program. Little or no extra capacity is available to allocate to additional auxiliary (OSD) packets.

Prior systems provided decoders to completely decode the received packet stream and extract the component signals (i.e. video, audio, data, etc.). These component signals were then recoded and remodulated into the desired modulation format. As a part of this process, any included time stamps were extracted, recalculated and reinserted into the packet stream. In addition, at this time, auxiliary information, such as OSD information, was formed into packets, and combined with received signal to be recoded and remodulated. The remodulated signal was then supplied to the, e.g. television receiver. However, such a system required a full demodulator, decoder, encoder and modulator, and a packetizer for auxiliary information. This is expensive, especially because there is no significant processing performed on the component signals in the packet stream.

U.S. patent application, Ser. No. 09/187,318, entitled "Auxiliary Data Insertion in a Transport Datastream" filed Nov. 16, 1998 by Knutson, illustrates another system for converting from one modulation format to another. In Ser. No. 09/187,318, a system is illustrated in which a packet stream in one format at a first bit rate is remodulated into another format at a second bit rate. In one embodiment, the first and second bit rates are equal, but the encoding of the bit stream is changed to delete some of the error detecting code bits, and replace the deleted bits with auxiliary information. More specifically, an input packet stream encoded using 8 VSB-t, in which the trellis encoding adds one error detection bit for each two packet stream bits, is remodulated using 8 VSB (no trellis encoding). By deleting the error detection bits added by the trellis encoder, one additional packet may be added for each two originally transmitted packets. These additional packets are used to transmit auxiliary information, or null packets if no auxiliary information is available.

In a second embodiment in Ser. No. 09/187,318, the second bit rate is a multiple of the first bit rate, and the extra bit rate capacity is used to transmit the auxiliary information. More specifically, the input packet stream is encoded using 8 VSB-t, while the output packet stream is encoded using 16 VSB. The output packet stream bit rate is two times the input packet stream bit rate. Thus, one additional packet may be added for each originally transmitted packet. These additional packets are used to transmit auxiliary information, or null packets if no auxiliary information is available. In both of these cases, the output packet stream bit rate is related to the input packet stream bit rate by a simple integer ratio: 1:3 in the first case, and 1:2 in the second case.

However, it may be desired to remodulate a packet stream at one bit rate to another packet stream at a bit rate which is not necessarily in a simple integer ratio with each other. For example, the bit rates of packet streams modulated by QAM and 16 VSB, respectively, are not related by a simple integer ratio. Thus, when remodulating a QAM modulated packet stream to a 16 VSB packet stream, it is not possible to simply insert a packet of auxiliary information into the output packet stream every n originally transmitted packets, as in Ser. No. 09/187,318, described above.

Still further, as described above, the timing of packets in these packet streams may be critical to proper decoding and display of the television image and sound represented by the packet stream, and time stamp information may be included in the packet stream. Thus, it is important to maintain the proper timing of the packets as much as possible during the remodulation process to ensure that any included time stamps are remain accurate.

A system which can remodulate a received packet stream signal at one bit rate into a packet stream at a different bit rate, not necessarily related to the first bit rate by a simple integer ratio, without requiring complete demodulation, decoding, encoding and remodulation of the component signals; which permits insertion of auxiliary data packets (e.g. OSD data); and which does not interfere with proper timing of the packets as maintained by time stamps is desirable.

In accordance with principles of the present invention, an output packet stream generator in a remodulator system includes a source of a stream of input transport packets and a source of additional packets. A multiplexer is coupled to the input transport packet stream source and the additional packet source and generates the output packet stream. A control signal has a variable characteristic having a first state when an input transport packet should be inserted into the output packet stream and a second state when additional packets should be inserted into the output packet stream. A multiplexer controller conditions the multiplexer to insert an input transport packet into the output packet stream when the control signal has the first state, and an additional packet into the output packet stream when the control signal has the second state.

Such a system can operate successfully when the bit rate of the output signal is not related by a simple integer ratio to the bit rate of the input signal.

IN THE DRAWINGS

Figure 1:
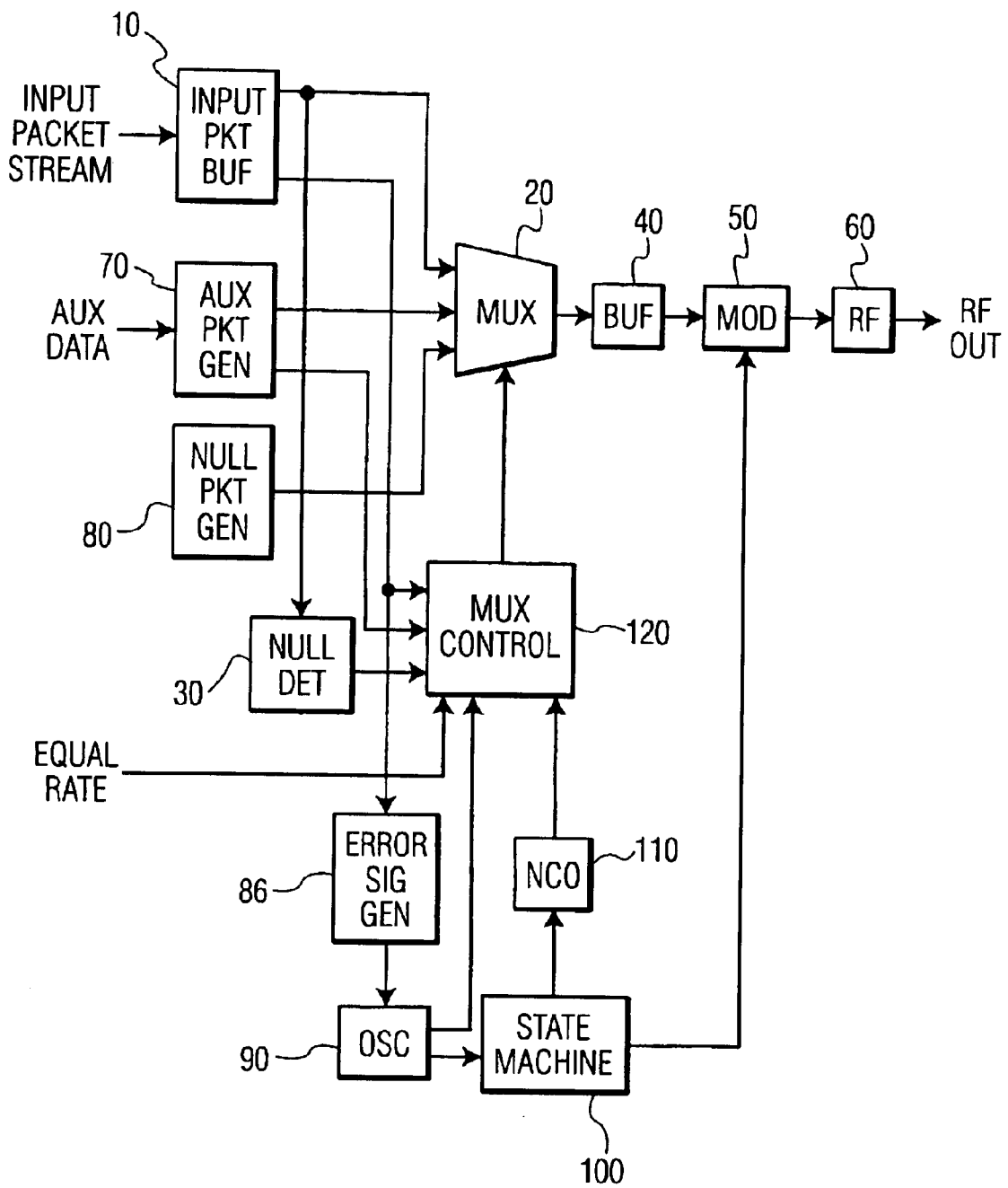
FIG. 1 is a block diagram of a portion of a remodulation system according to the present invention.

FIG. 1 is a block diagram of a portion of a remodulator system according to the present invention. In the illustrated embodiment, the remodulator is a part of a digital video cassette recorder in which digital signals representing a received packet stream in one format are recorded and then retrieved, and reformatted into a packet stream in another format. However, one skilled in the art will understand that such a remodulator system will find use in any system, such as a digital set top box, where the format of a packet stream must be changed.

Only those elements necessary for understanding the present invention are illustrated in FIG. 1. Other elements and interconnections among the elements are necessary in a complete remodulator system. One skilled in the art will understand what other elements are necessary, how to design and implement them, and interconnect them with the illustrated elements. One skilled in the art will also understand that other connections, such as status, control and clock signals exist among the illustrated elements but are not illustrated in order to simplify the drawing.

In FIG. 1, a source (not shown) of an input transport packet stream is coupled to an input terminal of an input packet buffer 10. The input transport packet stream source may be, for example, a playback circuit of a digital video cassette recorder or a set top box. The input transport packet stream source produces a digital signal carrying the transport packets, and an input clock signal synchronized to the input transport packets, in a known manner and supplies them both to the input packet buffer 10. A data output terminal of the input packet buffer 10 is coupled to a first data input terminal of a multiplexer (MUX) 20 and an input terminal of a null packet detector 30. An output terminal of the MUX 20 is coupled to an input terminal of a remodulation packet buffer 40. And output terminal of the remodulation packet buffer 40 is coupled to an input terminal of a modulator 50. An output terminal of the modulator 50 is coupled to an input terminal of an RF upconverter 60. An output terminal of the RF upconverter generates a RF signal at a predetermined frequency (e.g. channel 3) for reception by, for example, a digital television receiver (not shown).

A source of auxiliary data (not shown), which may be an on-screen display generator, is coupled to an input terminal of an auxiliary packet generator 70. A data output terminal of the auxiliary packet generator 70 is coupled to a second data input terminal of the multiplexer 20. An output terminal of a null packet generator 80 is coupled to a third data input terminal of the multiplexer 20.

An oscillator 90, which may be a voltage controlled crystal oscillator (VCXO), has a first output terminal coupled to an input terminal of a state machine 100 and a second input terminal, carrying a packet clock signal, coupled to a clock input terminal of a multiplexer controller 120. The state machine generates control signals for controlling the operation of the remodulation system illustrated in FIG. 1, not all of which are shown, in order to simplify the figure. A first control output terminal is coupled to the modulator 50, and a second control output terminal is coupled to an input terminal of a numerically controlled oscillator (NCO) 110.

The multiplexer controller 120 controls the operation of the MUX 20, in response to a plurality of control signals. A status output terminal from the input packet buffer 10 is coupled to a first input terminal of the multiplexer controller 120 and to an input terminal of an error signal generator 85. An output terminal of the error signal generator 85 is coupled to a control input terminal of the oscillator 90. A status output terminal from the auxiliary packet buffer 70 is coupled to a second input terminal of the multiplexer controller 120. An output terminal of the null detector 30 is coupled to a third input terminal of the multiplexer controller 120. A source of a signal indicating whether the bit rate of the input signal is substantially equal to the bit rate of the output signal is coupled to a fourth input terminal of the multiplexer controller 120. An output terminal of the NCO 110 is coupled to a fifth input terminal of the multiplexer controller 120. An output terminal of the multiplexer controller 120 is coupled to a control input terminal of the multiplexer 20.

Figures 2A, 2B, 2C, 2D:
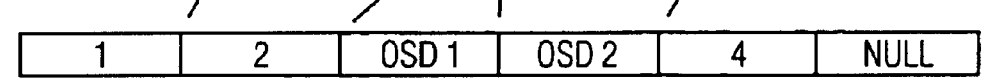
FIG. 2 is a timing diagram useful in understanding the operation of the system illustrated in FIG. 1.

FIG. 2 is a timing diagram useful in understanding the operation of the remodulation system illustrated in FIG. 1. In FIG. 2, time is illustrated in the horizontal direction, and respective packets in different packet streams are illustrated by different horizontal lines of rectangles. The time duration of each packet is represented by the horizontal size of the rectangle and temporal location of each packet is represented by the horizontal location of the rectangle. In each of FIGS. 2a through 2d, an upper line represents the input transport packet stream and a lower line represents the corresponding output packet stream.

In general, the remodulator of FIG. 1 operates to convert an input transport packet stream in one format into a modulated output packet stream in another format. The bit rate of the output packet stream is preferably greater than or equal to the bit rate of the input transport packet stream. It is possible to generate an output packet stream having a lower bit rate than that of the input transport packet stream only if the input transport packet stream has sufficient null packets that they can be removed to generate the output packet stream at the desired bit rate. If the bit rate of the output packet stream is equal to that of the input transport packet stream, the input transport packet stream must contain sufficient null packets to prevent buffer overflow, as described below.

When the bit rate of the output packet stream is greater than that of the input transport packet stream, additional packets are inserted into the output packet stream to generate the desired bit rate. This situation is illustrated in FIG. 2a. In FIG. 2a, the bit rate of the input transport packet stream is approximately, but not exactly, ⅔ of that of the output packet stream. Though illustrated as approximately ⅔, one skilled in the art will understand from the following description, that there need be no simple integer relationship between the respective bit rates of the input transport packet stream and the output packet stream.

In FIG. 2a, there are approximately three packets in the output packet stream in the time required for two packets in the input transport packet stream; or, put another way, each packet in the output packet stream takes approximately ⅔ of the time required by a packet in the input transport packet stream. Additional packets are inserted into the output packet stream at times selected to maintain the original temporal locations of the input transport packets to the extent possible, as described in more detail below. These additional packets are auxiliary packets containing auxiliary data (such as OSD data) if a packet of such auxiliary data is available. For example, in FIG. 2a, two input transport packets, 1 and 2 are inserted into the output packet stream as output packets 1 and 2. Then an additional packet is inserted into the output packet stream in order to temporally align the next input transport packet. In this case, it is assumed that an auxiliary (OSD) packet is available. Thus, an OSD packet, OSD 1, is next inserted into the output packet stream. If an auxiliary data packet is not available, then the additional packet is a null packet. This is illustrated after input transport packet 4. Because it is assumed no OSD packet is available at this time, a null packet is inserted into the output packet stream as the additional packet. One skilled in the art will understand that the sum of the bit rates of the input transport packet stream and the auxiliary data packet stream must be less than or equal to the bit rate of the output packet stream.

As described above, the input transport packet stream sometimes includes a null packet. When a null packet in the input transport data stream is detected, it may be either deleted, passed through to the modulator or replaced by an auxiliary data packet. If the bit rate of the output packet stream is greater than that of the input transport packet stream (FIG. 2a), then the presence of null packets may be ignored, and null packets may be treated as any other input transport packet to be inserted into the output packet stream. Alternatively, null packets may be detected and replaced by auxiliary data packets. This is illustrated in FIG. 2a in which a null packet (in the place of input transport packet 3) in the input transport packet stream is replaced by an OSD packet, OSD 2, in the output packet stream. The null packet could also have been inserted directly into the output packet stream, as described above.

The situation where the bit rate of the input transport packet stream is substantially equal to that of the output packet stream is illustrated in FIGS. 2b through 2d. In general, when the bit rates are equal, packets in the input transport packet stream are inserted directly into the output packet stream, as illustrated in FIG. 2b. Also, in general, if the input packet stream contains a null packet, either that null packet is inserted into the output packet stream, or it is replaced with an auxiliary data packet. This is illustrated in FIG. 2b in which a null packet (inserted for input transport packet 3) is inserted into the output packet stream, or replaced with an OSD packet, if one is available.

If the bit rate of the output packet stream is slightly slower than that of the input transport packet stream, as described above, then, input transport packets arrive slightly faster than output packets depart. In this case, input transport packets slowly accumulate in the input packet buffer 10. Eventually, the input transport packet buffer 10 becomes full or nearly full. The input packet buffer 10 conditions its status signal to indicate that it is full or nearly full. In this situation, a null packet in the input transport packet stream is deleted to minimize potential overflow of the input packet buffer. This is illustrated in FIG. 2c, in which a null packet (inserted for input transport packet N+2) is deleted. This enables the output packet stream to become temporally more aligned with the input transport packet stream.

In addition, when the input packet buffer becomes full or nearly full, the error signal generator 85 responds to the status signal from the input packet buffer 10 by conditioning the oscillator 90 to increase the frequency of the output clock signal. The clock signal from the oscillator 90 will increase the bit rate of the output packet stream, and more closely match the bit rate of the input packet stream, minimizing the possibility of an overflow of the input packet buffer 10.

Similarly, if the bit rate of the output packet stream is slightly faster than that of the input transport packet stream, as described above, output packets depart faster than input transport packets arrive. In this case, the input packet buffer 10 eventually runs out of packets. The input packet buffer 10 conditions its status signal to indicate that it is empty. In this situation additional packets, being either null packets or auxiliary data packets, are inserted into the output packet stream, to provide the required bits for the remodulation process. This is illustrated in FIG. 2d, in which an output packet N+2 is required in the output packet stream, but it has not yet been received from the input transport packet stream source. A null or auxiliary data (OSD) packet is inserted into the output packet stream to fill the time for which the N+2 input transport packet is not yet available.

In addition, when the input packet buffer becomes empty, the error signal generator 85 responds to the status signal from the input packet buffer 10 by conditioning the oscillator 90 to decrease the frequency of the output clock signal. The clock signal from the oscillator 90 will decrease the bit rate of the output packet stream, and more closely match the bit rate of the input packet stream, minimizing the possibility of an underflow of the input packet buffer 10.

If, on the other hand, the input transport buffer 10 is neither full or nearly full nor empty, and if a packet of auxiliary data is available, then the null packet in the input transport packet stream is replaced with an additional packet containing auxiliary data if an auxiliary data packet is available, as described above with reference to FIG. 2b. If auxiliary data is not available, then a null packet is inserted into the output packet stream.

More specifically, in operation, the input packet buffer 10 receives input transport packets and time-smooths any data bursts from, and compensates for jitter in, the input transport packet stream source (not shown). The buffered input transport packets are provided to the multiplexer 20 and the null packet detector 30. A status signal from the input packet buffer 10 indicates when the input packet buffer is full or nearly full, is empty, or is otherwise operating in a nominal mode (i.e. neither empty nor full). A status signal from the null packet detector 30 indicates when the next packet in the input packet buffer 10 is a null packet. The auxiliary data packet generator 70 receives auxiliary data (e.g. OSD data) from the system containing the remodulator illustrated in FIG. 1, accumulates the data and forms auxiliary data packets. The auxiliary data packets, when available, are provided to the multiplexer 20. A status signal from the auxiliary data packet generator 70 indicates when an auxiliary data packet is available. The null packet generator 80 continually generates a null packet, and provides the null packet to the multiplexer 20. The equal rate signal provides an indication of whether the bit rate of the output packet stream is substantially equal to that of the input transport packet stream.

In a digital television signal, packets must be present in the packet stream at specific times, or time intervals, in order for time stamps inserted into the packet stream to maintain accurate control of the display of the television program carried by the packet stream. In order to preserve this timing during the remodulation process, input transport packets must be inserted into the output packet stream at substantially the same temporal locations as they were in the input transport packet stream. The additional packets inserted into the packet stream to produce the proper output bit rate must be inserted between the inserted input transport packets. Furthermore, this timing must be maintained despite the fact that the bit rates of the input transport packet stream and the output packet stream are not in a simple integer ratio.

To control this, the combination of the oscillator 90, state machine 100 and numerically controlled oscillator (NCO) 110 produces a bistate control signal having a first state for times when an input transport packet must be inserted into the output packet stream, and a second state at times when an additional packet (either auxiliary or null) must be inserted, in a manner to be described in more detail below. A signal generated in this manner may be controlled to have the appropriate duty cycle for substantially any ratio of bit rates. The "in put/additional" signal is supplied to the multiplexer control circuit 120.

The multiplexer control circuit 120 operates in response to these status signals, and to the packet clock signal received from the oscillator 90, to provide a control signal to the MUX 20. In response to this control signal, the MUX 20 operates to selectively couple either an input transport packet, an auxiliary data packet or a null packet to its output terminal, in a manner described in more detail below. The MUX 20, thus generates an output packet stream having a bit rate required by desired the modulation technique. The packet stream from the MUX 20 is buffered by the remodulation packet buffer 40 to smooth out any timing jitter.

The modulator 50 formats the digital packet stream from the remodulation packet buffer 40 in the appropriate manner to produce a data stream at the predetermined modulation bit rate, and modulates the formatted data stream. In the illustrated embodiment, the packet stream is 16 VSB modulated, as described above, and has a bit rate of around 39 Mbps. It is possible for the output packet stream to be modulated according to any modulation scheme, for example, either 16 VSB or 8 VSB. The control signal from the state machine 100 controls the modulation scheme used by the modulator 50, while other control signals control the bit rate of the output packet stream to conform to the selected modulation scheme. The modulated packet stream from the modulator 50 is then upconverted by the RF upconverter 60 to a desired RF frequency, for example, the channel 3 frequency which may be received by a digital television receiver.

Referring now to the operation of the combination of the MUX 20 and the multiplexer controller circuit 120, there are five basic functions which may be performed: 1) insert an input transport packet into the output packet stream; 2) insert a null packet into the output packet stream; 3) insert an auxiliary data packet into the output packet stream; 4) delete a null packet from the input transport packet stream; and 5) replace a null packet in the input transport packet stream with an auxiliary data packet in the output packet stream (which is a combination of 3) and 4)). The function performed is controlled by the multiplexer control circuit 120 in response to the status signals, as described above.

As described above, the transport/additional status signal from the NCO 110 indicates times when an input transport packet should be placed in the next packet slot in the output packet stream and times when an additional packet (auxiliary or null) should be placed in the next packet slot in the output packet stream. This status signal is always set to "transport" when the bit rate of the input transport packet stream is equal to that of the output packet stream. When the packet clock signal from oscillator 90 indicates the occurrence of the next output packet slot, an input transport packet is inserted into the output packet stream if this status signal indicates that a transport packet is required, and either an auxiliary or null packet is inserted into the output packet stream if this status signal indicates that an additional packet is required.

The null detect signal from the null detector 30 indicates that the next input transport packet in the input packet buffer is a null packet. If the bit rate of the output packet signal is greater than that of the input transport packet stream, then this signal may be ignored, and the null packet treated just as any other packet in the input transport packet stream. If the bit rate of the output packet stream is substantially equal to that of the input transport packet stream, then the null detect signal is processed as follows. If the input packet buffer 10 is full or nearly full, as indicated by its status signal, then the detected null packet is deleted. If the input packet buffer 10 is not full, and an auxiliary data packet is available, as indicated by the status signal from the auxiliary packet generator 70, then the auxiliary data packet may be substituted for the null packet. Otherwise the null packet is inserted into the output packet stream.

The auxiliary data available signal from the auxiliary data packet generator 70 indicates that a packet of auxiliary data is available. If the transport/additional status signal indicates that an additional packet is required, and the auxiliary data available signal indicates that an auxiliary data packet is available, then the auxiliary data packet is inserted into the output packet stream. Or if the bit rate of the input transport packet stream bit is substantially equal to that of the output packet stream, the next packet in the input transport packet stream packet is a null packet and the input packet buffer is not full or nearly full, then the auxiliary data packet is inserted into the output packet stream.

The status signal from the input packet buffer 10 indicates whether the input packet buffer 10 is full or nearly full, is empty, or is otherwise operating nominally (i.e. neither full nor empty). If the buffer is full or nearly full, then any null packets detected in the input transport packet stream, as indicated by the status signal from the null detector 30, are deleted. If the buffer is empty, then additional packets (either auxiliary or null packets) are inserted into the output packet stream. If the buffer is operating nominally, then neither of these actions are taken.

The equal rate signal indicates whether the bit rate of the output packet stream is substantially equal to that of the input packet stream. The response of the multiplexer control circuit 120 to this signal has been described above.

The multiplexer control circuit 120 generates the control signal for the MUX 20. This signal may be three binary signals: a first for conditioning the MUX 20 to couple an input transport packet from the input packet buffer 10 to the remodulation packet buffer 40; a second for conditioning the MUX 20 to couple an auxiliary data packet from the auxiliary packet generator 70 to the remodulation packet buffer 40; and a third for conditioning the MUX 20 to couple a null packet from the null packet generator 80 to the remodulation packet buffer 40. Alternatively, the control signal could be a two-bit binary encoded signal having a value which indicates which of the above actions is to be taken.

The multiplexer control circuit 120 may be designed and implemented as hardwired logic, either combinatorial or sequential, or as a software program executing on a microprocessor. One skilled in the art will understand how to design and implement such a control circuit 120 in either form.

The state machine 100 controls the overall operation of the remodulator illustrated in FIG. 1. One skilled in the art will understand the sequencing and the control signals required to properly time the operation of the remodulator illustrated in FIG. 1, and will understand how to design and implement a state machine 100 for generating those control signals.

Figure 3:
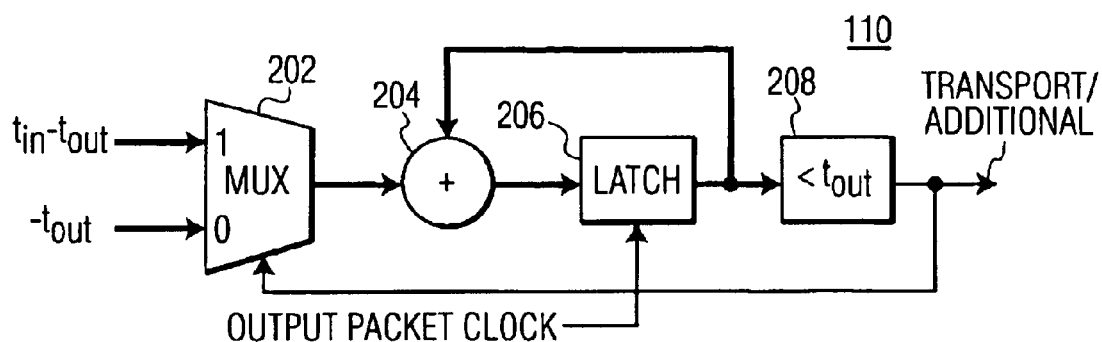
FIG. 3 is a more detailed block diagram of a numerically controlled oscillator which may be used in the system illustrated in FIG. 1.
Figure 4:
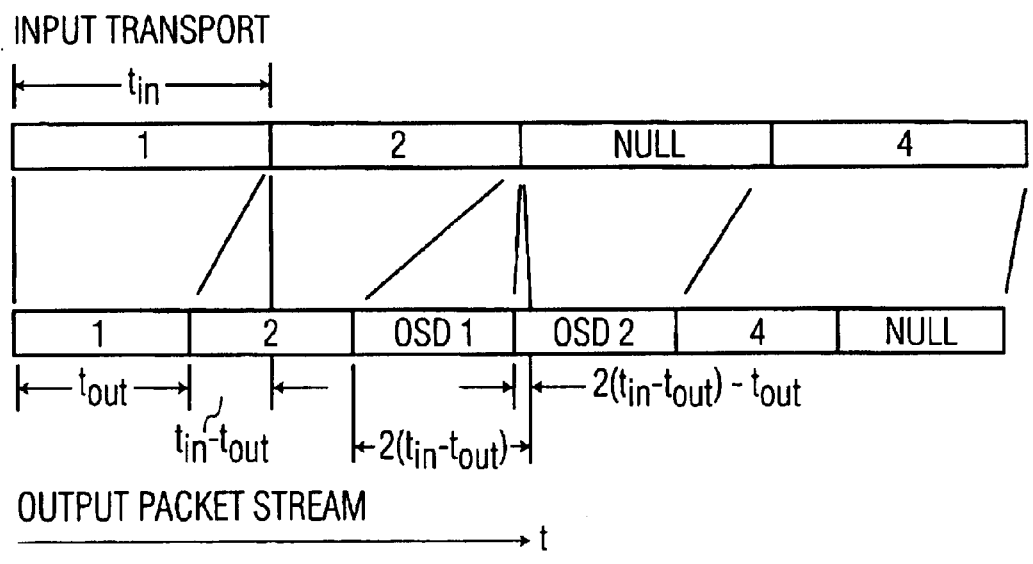
FIG. 4 is a timing diagram useful in understanding the operation of the numerically controlled oscillator illustrated in FIG. 3.

FIG. 3 is a more detailed block diagram of a numerically controlled oscillator 110 which may be used in the system illustrated in FIG. 1, and FIG. 4 is a timing diagram useful in understanding the operation of the numerically controlled oscillator 110 illustrated in FIG. 3. In FIG. 3, the lines represent digital signal carrying lines, and thicker lines represent multibit digital signals having more bits than thinner lines. In FIG. 3, a signal representing the difference in time duration between the input and output transport packets, $t_{in}-t_{out}$, is coupled to a first data input terminal of a multiplexer (MUX) 202. A signal representing the negative of the time duration of the output transport packet, $-t_{out}$, is coupled to a second data input terminal of the MUX 202. An output terminal of the MUX 202 is coupled to a first input terminal of an adder 204. An output terminal of the adder 204 is coupled to an input terminal of a latch 206. An output terminal of the latch 206 is coupled to a second input terminal of the adder 204. The latch 206 is clocked by the output packet clock signal. The combination of the adder 204 and latch 206 form an accumulator.

The output terminal of the latch 206 is also coupled to an input terminal of a comparator 208. An output terminal of the comparator 208 generates the transport/additional signal, described above, which is also coupled to a control input terminal of the MUX 202. The transport/additional signal has a logic '1' value at times when a packet from the input transport packet stream is to be inserted into the output packet stream, and a logic '0' value at times when an additional packet (auxiliary or null) is to be inserted into the output packet stream. This is further indicated by the horizontal line over "additional" in FIG. 3. The transport/ additional signal is coupled to the multiplexer control circuit 120 (of FIG. 1).

In general operation, the value of the signal at the output of the latch 206 (i.e. the output of the accumulator) represents the amount of time the input transport packet stream is in advance of the output packet stream. While this value is less than the time duration of an output packet stream packet, then input transport packets must be inserted into the output packet stream because there is no time for an additional packet in the output packet stream. When, however, this value becomes greater than the time duration of an output packet stream packet, this indicates that there is time for an additional packet to be inserted into the output packet stream. When this occurs, the time duration of an output packet is subtracted from this value to make up for the additional packet inserted into the output packet stream and the operation continues, all as described in more detail below.

The comparator 208 compares the value of the signal from the latch 206 to a value representing the time duration of the output packet $t_{out}$. If the value of the latch 206 output signal is less than the value of the time duration of the output packet $t_{out}$, then the comparator 208 generates a logic '1' signal, indicating that an input transport packet is to be inserted into the output packet stream. If the value of the latch 206 output signal is greater than the value of the time duration of the output packet $t_{out}$, then the comparator 208 generates a logic '0' signal, indicating that an additional packet is to be inserted into the output packet stream.

Referring to FIG. 4, the starting time of the packet 1 in the input transport packet stream is temporally aligned with the starting time of packet 1 in the output packet stream. At this time, and under this condition, the value at the output terminal of the latch 206 is zero. This is less than the value of the time duration of the output packet $t_{out}$ and the comparator 208, thus, generates a logic '1' signal. This indicates that an input transport packet is to be inserted into the output packet stream, and conditions the multiplexer 202 to couple the time difference signal $t_{in}-t_{out}$ to the input of the adder 204, whose output now has the value of $t_{in}-t_{out}$.

The latch 206 is clocked at the ending time of output packet 1, and the latch 206 output signal becomes $t_{in}-t_{out}$. In the illustrated embodiment, this is still less than the time duration of the output packet $t_{out}$ so the output of the comparator 208 remains a logic '1' signal. The multiplexer 202, thus, continues to couple the time difference signal $t_{in}-t_{out}$ to the input of the adder 204, whose output now has the value of $2(t_{in}-t_{out})$.

The latch 206 is then clocked at the ending time of output packet 2, and the latch 206 output signal becomes $2(t_{in}-t_{out})$. In the illustrated embodiment, this is greater than the time duration of the output packet $t_{out}$. The comparator 208, thus, generates a logic '0' signal. This indicates that an additional packet is to be inserted into the output packet stream, and conditions the multiplexer 202 to couple the $-t_{out}$ signal to the input of the adder 204, whose output now has the value of $2(t_{in}-t_{out})-t_{out}$. This represents the time the input transport packet stream remains in advance of the output packet stream after the additional packet has been inserted into the output packet stream.

The latch 206 is clocked again at the ending time of the additional packet OSD1, and the latch 206 output signal becomes $2(t_{in}-t_{out})-t_{out}$. This is less than the time duration of the output packet $t_{out}$ so the output of the comparator 208 becomes a logic '1' signal. In response, the multiplexer 202 couples the time difference signal $t_{in}$–$t_{out}$ to the input of the adder 204, and an input transport packet is inserted into the output packet stream. The operation described above is repeated continually, inserting additional packets into the output packet stream when there is time enough to fit them in among the input transport packets. The circuit illustrated in FIG. 3 can operate for any time durations for the input and output packets. More specifically, these time durations do not have to be in an integer ratio.

Figure 5:
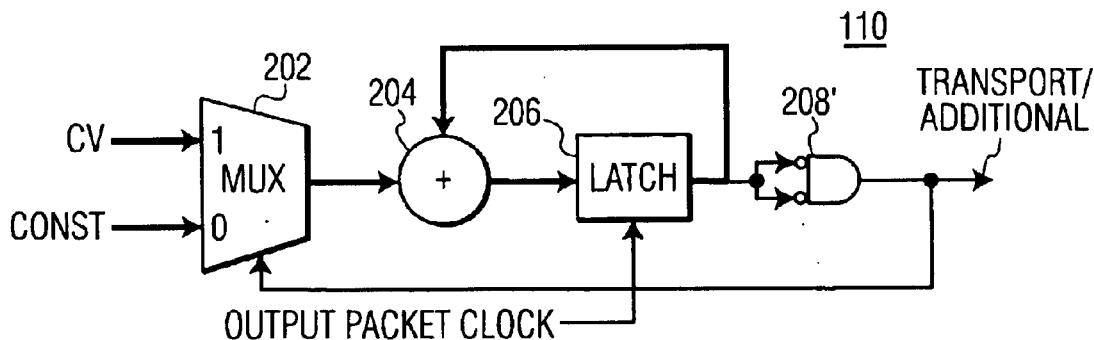
FIG. 5 is a more detailed block diagram of a practical embodiment of a numerically controlled oscillator corresponding to that illustrated in FIG. 3.

FIG. 5 is a more detailed block diagram of a practical embodiment of a numerically controlled oscillator 110 corresponding to that illustrated in FIG. 3. In FIG. 5, those elements which are the same as those illustrated in FIG. 3 are designated with the same reference numbers and are not described in detail below. In FIG. 5, two adjustments are made to the circuit illustrated in FIG. 3. First, numbers representing values are maintained as binary fixed point numbers having the bit format "SI.FFF . . . " where S represents a sign bit, I represents an integer bit and F represents fractional bits, all in a known manner. The accuracy with which the NCO 110 operates depends upon the size of these numbers. In a preferred embodiment these numbers are 24 bits in width.

Second, values of the various parameters are normalized to the time duration of the output packets $t_{out}$. That is, the time duration parameters are all expressed as fractions of an output packet time duration $t_{out}$. In addition, the packet time duration values are replaced by corresponding packet rate values, as described in more detail below. These adjustments make implementation of the NCO 110 easier to fabricate and more efficient to operate.

More specifically, the various parameters are normalized by dividing them by $t_{out}$ in a known manner. In addition, the packet time duration parameters are replaced by packet rate parameters: the input transport packet rate is designated $r_v$, and equals 1/tin; the output packet rate is designated $r_t$ and equals $1/t_{out}$.

$$CV = \frac{t_{in} - t_{out}}{t_{out}} \quad (1)$$

$$= \frac{t_{in}}{t_{out}} - 1$$

$$= \frac{r_t}{r_v} - 1$$

Consequently, the time difference parameter $t_{in}$–$t_{out}$, coupled to the first input terminal of the multiplexer 202, is normalized to a control value CV as illustrated in equation (1). The control value CV is coupled to the NCO 110 from the state machine 100 (of FIG. 1).

The $t_{out}$ signal supplied to the second input terminal of the multiplexer 202 (of FIG. 3) is normalized to a value of –1, and the value compared in comparator 208 (of FIG. 3) is normalized to a value of 1. Because the comparator 208 (of FIG. 3) compares the value of the output signal of the latch 206 to 1, and because values are represented by fixed point binary numbers, the comparator 208 may be implemented by a two-input, negative input, AND gate 208', which is responsive to the most significant two bits (S and I) of the output of the latch 206, representing the sign and integer portion of the latch output value. The AND gate 208' generates a logic '1' signal when the value of both of these two bits is logic '0', indicating a value less than 1. If either of these bits is logic '1', indication a value greater than 1, then the AND gate 208' generates a logic '0' signal. The remainder of the circuit illustrated in FIG. 5 operates as described above with reference to FIG. 3.

Figure 6:
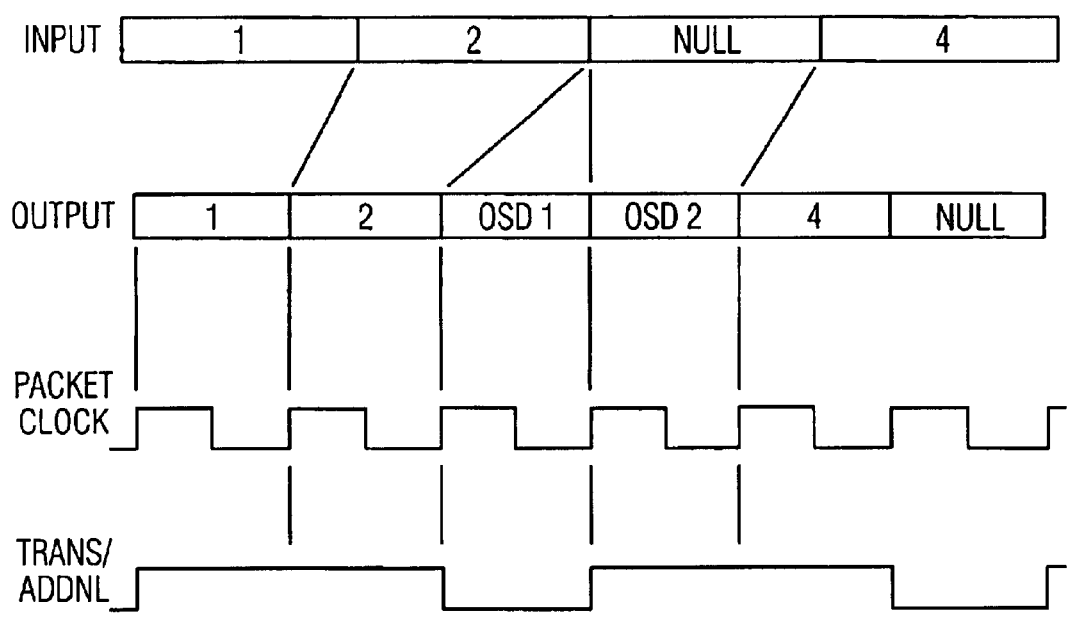
FIG. 6 is a timing diagram useful in understanding the operation of the numerically controlled oscillator illustrated in FIG. 5.

FIG. 6 is a timing diagram useful in understanding the operation of the numerically controlled oscillator illustrated in FIG. 5. In FIG. 6, the top two lines represent the input transport packet stream and corresponding output packet stream as illustrated in FIG. 2a. The third waveform represents the packet clock supplied to the multiplexer controller 120 from the oscillator 90. Each leading edge of the packet clock identifies the beginning of a packet slot in the output packet stream. At the beginning of each packet slot in the output packet stream (i.e at the leading edge of the packet clock) the transport/additional signal is sampled. If it is a logic '1', then an input transport packet is inserted into the output packet stream. If it is a logic '0' an additional (auxiliary or null) packet is inserted into the output packet stream, all as described in more detail.

The input datastream can exhibit a QPSK modulation format or a QAM (64-QAM or 256-QAM) modulation format, while the output datastream can exhibit a VSB modulation format (8-VSB or 16-VSB), for example. Other input/output modulation formats are possible.

What is claimed is:

1. In a remodulator system, a generator of an output packet stream having a first rate, comprising:

a source of a stream of input transport packets having a second rate;

a source of additional packets;

a multiplexer, coupled to the input transport packet stream source and the additional packet source, for generating the output packet stream;

a source of a control signal, responsive to the first and second rates, for generating the control signal having a first state when an input transport packet should be inserted into the output packet stream and a second state when additional packets should be inserted into the output packet stream wherein the control signal source accumulates the amount of time the input transport packet stream is in advance of the output packet stream, and generates the control signal having the second state when the accumulated time is greater than a time duration of each output packet, and having the first state otherwise; and a multiplexer controller, coupled between the control signal source and the multiplexer, for conditioning the multiplexer to insert an input transport packet into the output packet stream when the control signal has the first state, and to insert an additional packet into the output packet stream when the control signal has the second state.

2. The system of claim 1, wherein when the control signal source generates the control signal having the second state, the time duration of an output packet is decremented from the accumulated time.

3. In a remodulator system, a generator of an output packet stream having a first rate, comprising:

a source of a stream of input transport packets having a second rate;

a source of additional packets;

a multiplexer, coupled to the input transport packet stream source and the additional packet source, for generating the output packet stream;

a source of a control signal, responsive to the first and second rates, for generating the control signal having a first state when an input transport packet should be inserted into the output packet stream and a second state when additional packets should be inserted into the output packet stream wherein the control signal source comprises:
an accumulator for generating a signal having a value representing the time the input packet stream is in advance of the output packet stream; and
a comparator for comparing the accumulator output signal to a signal representing an output packet time duration, and if the value represented by the accumulator output signal is less than the value representing an output packet time duration, generating the control signal having the first state, and if the value represented by the accumulator output signal is greater than the value representing an output packet time duration, generating the control signal having the second state; and
a multiplexer controller, coupled between the control signal source and the multiplexer, for conditioning the multiplexer to insert an input transport packet into the output packet stream when the control signal has the first state, and to insert an additional packet into the output packet stream when the control signal has the second state.

4. The system of claim 3 wherein the control signal source further comprises:
a source of a time difference signal having a value representing the difference in input packet time duration and output packet time duration;
a source of an output packet time signal having a value representing the time duration of an output packet; and
the accumulator is responsive to the time difference signal and the output packet time signal, for incrementing by the value of the time difference signal when the control signal has the first state, and decrementing by the value of the output packet time signal when the control signal has the second state.

5. The system of claim 4 wherein:
the time difference signal source generates a signal CV having the value:

$$CV = \frac{r_t}{r_v} - 1$$

where the value $r_v$ is the input transport packet rate and $r_t$ is the output packet rate;
the output packet time signal source generates a signal having the value −1; and
the comparator compares the accumulated time signal to a signal having the value 1.

6. The system of claim 4 wherein the accumulator further comprises:
a multiplexer, having a first data input terminal coupled to the time difference signal source, a second data input terminal coupled to the output packet time signal source, a control input terminal responsive to the control signal, and an output terminal;
an adder, having a first input terminal coupled to the output terminal of the multiplexer, a second input terminal, and an output terminal; and
a latch, having an input terminal coupled to the output terminal of the adder, and an output terminal coupled to the second input terminal of the adder and to the comparator.

7. In a remodulator system, a generator of an output packet stream having a first rate, comprising:

a source of a stream of input transport packets having a second rate;
a source of additional packets;
a source of an output packet clock signal indicating when an output packet is to be inserted into the output packet stream;
a multiplexer, coupled to the input transport packet stream source and the additional packet source, for generating the output packet stream;
a source of a control signal, responsive to the first and second rates, for generating the control signal having a first state when an input transport packet should be inserted into the output packet stream and a second state when additional packets should be inserted into the output packet stream; and
a multiplexer controller, coupled between the control signal source and the multiplexer, for conditioning the multiplexer to insert an input transport packet into the output packet stream when the control signal has the first state, and to insert an additional packet into the output packet stream when the control signal has the second state wherein the multiplexer controller further samples the control signal in response to the output packet clock signal and conditions the multiplexer to insert an input transport packet into the output packet stream in response to the output packet clock signal when the sampled control signal has the first state, and an additional packet into the output packet stream in response to the output packet clock signal when the sampled control signal has the second state.

8. In a remodulator system, a generator of an output packet stream having a first rate, comprising:
a source of a stream of input transport packets having a second rate;
a source of additional packets;
a multiplexer, coupled to the input transport packet stream source and the additional packet source, for generating the output packet stream;
a source of a control signal, responsive to the first and second rates, for generating the control signal having a first state when an input transport packet should be inserted into the output packet stream and a second state when additional packets should be inserted into the output packet stream wherein the control signal source comprises a variable duty cycle oscillator generating the control signal having a duty cycle having an 'on' time representing the fraction of the time input transport packets should be inserted into the output packet stream, and an off time representing the fraction of the time additional packets should be inserted into the packet stream; and
a multiplexer controller, coupled between the control signal source and the multiplexer, for conditioning the multiplexer to insert an input transport packet into the output packet stream when the control signal has the first state, and to insert an additional packet into the output packet stream when the control signal has the second state.

9. The system of claim 8 wherein the variable duty cycle oscillator comprises:
an accumulator, having an input and an output terminal, for incrementing the value of the signal at the output terminal by the value of the signal at the input terminal;
a control signal generator, coupled to the output terminal of the accumulator, for generating the control signal;

a multiplexer, coupled to the input terminal of the accumulator and responsive to the control signal, for coupling a control value to the input terminal of the accumulator when the control signal has the first state and for coupling a constant value to the input terminal of the accumulator when the control signal has the second state.

10. The system of claim 9 wherein the control signal generator comprises circuitry for generating the control signal having the first state when the value at the output terminal of the accumulator is less than a predetermined value and having the second state otherwise.

11. The system of claim 9 wherein:
the control value has the value CV:

$$CV = \frac{r_t}{r_v} - 1$$

where $r_v$ is the bit rate of the input packet stream and $r_t$ is the bit rate of the output transport packet stream.

12. In a remodulator system, a generator of an output packet stream having a first rate, comprising:
a source of a stream of input transport packets having a second rate wherein:
the second rate is equal to the first rate;
the input transport packet stream contains null packets; and
the input transport packet stream source comprises an input packet buffer, generating a status signal indicating if the buffer is full or nearly full;
a source of additional packets;
a multiplexer, coupled to the input transport packet stream source and the additional packet source, for generating the output packet stream;
a source of a control signal, responsive to the first and second rates, for generating the control signal having a first state when an input transport packet should be inserted into the output packet stream and a second state when additional packets should be inserted into the output packet stream; and
a multiplexer controller, coupled between the control signal source and the multiplexer, for conditioning the multiplexer to insert an input transport packet into the output packet stream when the control signal has the first state, and to insert an additional packet into the output packet stream when the control signal has the second state, wherein the multiplexer controller is further responsive to the status signal from the input packet buffer to condition the multiplexer to delete a null packet from the input transport packet stream if the input packet buffer is full or nearly full.

13. The system of claim 12 wherein:
the additional packet source comprises:
a source of auxiliary data packets, responsive to a source of auxiliary data, generating a status signal indicating that an auxiliary data packet is available; and
a source of null packets;
the system further comprises a null packet detector, coupled to the input transport packet stream source, for generating a status signal indicating if a next input transport packet is a null packet; and
the multiplexer controller is further responsive to the status signal from the auxiliary packet source and the status signal from the null packet detector, for substituting an auxiliary data packet for a null packet in the input transport packet stream if an auxiliary data packet is available, and substituting a null packet from the null packet source for the null packet in the input transport packet stream if an auxiliary data packet is not available.

14. The system of claim 12 wherein:
the system further comprises a source of a signal indicating if the first predetermined bit rate is equal to the second predetermined bit rate; and
the multiplexer controller is responsive to the status signal from the input packet buffer and the signal indicating if the first predetermined bit rate is equal to the second predetermined bit rate for conditioning the multiplexer to delete the null packet from the output packet stream if the first predetermined bit rate is equal to the second predetermined bit rate and the input packet buffer is full or nearly full.

15. In a remodulator system, a generator of an output packet stream having a first rate, comprising:
a source of a stream of input transport packets having a second rate wherein: the first rate is greater than the second rate and the input transport packet stream contains null packets;
a source of additional packets wherein the additional packet source further comprises:
a source of auxiliary data packets, responsive to a source of auxiliary data, generating a status signal indicating that an auxiliary data packet is available; and
a source of null packets;
a null packet detector, coupled to the input transport packet stream source, for generating a status signal indicating if a next input transport packet is a null packet;
a multiplexer, coupled to the input transport packet stream source and the additional packet source, for generating the output packet stream wherein the multiplexer is further coupled to the auxiliary data packet source and the null packet source;
a source of a control signal, responsive to the first and second rates, for generating the control signal having a first state when an input transport packet should be inserted into the output packet stream and a second state when additional packets should be inserted into the output packet stream; and
a multiplexer controller, coupled between the control signal source and the multiplexer, for conditioning the multiplexer to insert an input transport packet into the output packet stream when the control signal has the first state, and to insert an additional packet into the output packet stream when the control signal has the second state wherein the multiplexer controller is responsive to the status signal from the auxiliary data packet source, for conditioning the multiplexer to insert an auxiliary data packet into the output packet stream as an additional packet if an auxiliary data packet is available, and otherwise to insert a null packet into the output packet stream as an additional packet and is further responsive to the status signal from the auxiliary packet source and the status signal from the null packet detector, for substituting an auxiliary data packet for the null packet in the output packet stream if an auxiliary data packet is available.

16. In a remodulator system, a generator of an output packet stream having a first rate, comprising:

a source of a stream of input transport packets having a second rate;

a source of additional packets;

a multiplexer, coupled to the input transport packet stream source and the additional packet source, for generating the output packet stream;

a source of a control signal, responsive to the first and second rates, for generating the control signal having a first state when an input transport packet should be inserted into the output packet stream and a second state when additional packets should be inserted into the output packet stream wherein the control signal source accumulates the amount of time the input transport packet stream is in advance of the output packet stream, and generates the control signal having the second state when the accumulated time is greater than a time duration of each output packet, and having the first state otherwise;

a multiplexer controller, coupled between the control signal source and the multiplexer, for conditioning the multiplexer to insert an input transport packet into the output packet stream when the control signal has the first state, and to insert an additional packet into the output packet stream when the control signal has the second state; and a modulator, coupled to the multiplexer, for modulating the output packet stream.

17. In a remodulator system, a generator of an output packet stream having a first rate, comprising:

a source of a stream of input transport packets having a second rate wherein respective packets in the input packet stream are meant to be transmitted at corresponding predetermined times;

a source of additional packets;

a multiplexer, coupled to the input transport packet stream source and the additional packet source, for generating the output packet stream;

a source of a control signal, responsive to the first and second rates, for generating the control signal having a first state when an input transport packet should be inserted into the output packet stream and a second state when additional packets should be inserted into the output packet stream wherein the control signal source accumulates the amount of time the input transport packet stream is in advance of the output packet stream, and generates the control signal having the second state when the accumulated time is greater than a time duration of each output packet, and having the first state otherwise; and a multiplexer controller, coupled between the control signal source and the multiplexer, for conditioning the multiplexer to insert an input transport packet into the output packet stream when the control signal has the first state, and to insert an additional packet into the output packet stream when the control signal has the second state wherein the multiplexer controller conditions the multiplexer to insert respective input transport packets into the output packet stream at substantially the corresponding times.

18. In a remodulator system, a generator of an output packet stream having a first rate, comprising:

a source of a stream of input transport packets having a second rate;

a source of additional packets;

a multiplexer, coupled to the input transport packet stream source and the additional packet source, for generating the output packet stream;

a source of a control signal, responsive to the first and second rates, for generating the control signal having a first state when an input transport packet should be inserted into the output packet stream and a second state when additional packets should be inserted into the output packet stream wherein the control signal source accumulates the amount of time the input transport packet stream is in advance of the output packet stream, and generates the control signal having the second state when the accumulated time is greater than a time duration of each output packet, and having the first state otherwise; and a multiplexer controller, coupled between the control signal source and the multiplexer, for conditioning the multiplexer to insert an input transport packet into the output packet stream when the control signal has the first state, and to insert an additional packet into the output packet stream when the control signal has the second state; wherein:

the input packet stream format is compatible with one of a QAM or QPSK modulation format; and the output packet stream format is compatible with an 8-VSB or 16-VSB modulation format.

19. The remodulator system of claim 7, wherein:

the source of additional packets represents auxiliary on-screen display (OSD) information.

20. The remodulator system of claim 7, wherein:

the input packet stream format is compatible with one of QAM, QPSK or VSB modulation formats; and the output packet stream format is compatible with a different one of said QAM, QPSK or VSB modulation formats.

* * * * *